US009253100B2

(12) United States Patent  
Stathopoulos et al.

(10) Patent No.: US 9,253,100 B2  
(45) Date of Patent: Feb. 2, 2016

(54) ASYNCHRONOUS VIRTUAL MACHINE REPLICATION

(75) Inventors: Thanos Stathopoulos, Jersey City, NJ (US); Pramod Koppol, Manalapan, NJ (US); Adiseshu Hari, Holmdel, NJ (US); Dimitrios Stiliadis, San Jose, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 224 days.

(21) Appl. No.: 12/964,900

(22) Filed: Dec. 10, 2010

(65) Prior Publication Data

US 2012/0151084 A1 Jun. 14, 2012

(51) Int. Cl.
  G06F 9/455 (2006.01)
  H04L 12/851 (2013.01)
  G06F 9/48 (2006.01)
  G06F 11/14 (2006.01)
  H04L 12/855 (2013.01)
  G06F 11/20 (2006.01)

(52) U.S. Cl.
  CPC .............. *H04L 47/2408* (2013.01); *G06F 9/48* (2013.01); *G06F 11/1479* (2013.01); *G06F 11/1484* (2013.01); *G06F 11/2097* (2013.01); *H04L 47/245* (2013.01); *H04L 47/2466* (2013.01); *G06F 11/2038* (2013.01)

(58) Field of Classification Search
  USPC ............................................ 709/232; 718/1
  See application file for complete search history.

(56) References Cited

U.S. PATENT DOCUMENTS

| 7,944,923 | B2* | 5/2011 | Tripathi et al. | 370/392 |
| 8,250,586 | B2* | 8/2012 | Nelson | 719/312 |
| 2003/0187915 | A1* | 10/2003 | Sun et al. | 709/201 |
| 2008/0008202 | A1 | 1/2008 | Terrell et al. | |
| 2009/0007106 | A1* | 1/2009 | Araujo et al. | 718/1 |
| 2009/0150527 | A1* | 6/2009 | Tripathi et al. | 709/221 |
| 2009/0238189 | A1* | 9/2009 | Tripathi et al. | 370/395.32 |
| 2010/0153514 | A1* | 6/2010 | Dabagh et al. | 709/213 |
| 2010/0250883 | A1* | 9/2010 | Oshida | 711/162 |
| 2010/0322255 | A1* | 12/2010 | Hao et al. | 370/398 |
| 2011/0066819 | A1* | 3/2011 | Mashtizadeh et al. | 711/162 |
| 2011/0134931 | A1* | 6/2011 | Merwe et al. | 370/401 |
| 2012/0042034 | A1* | 2/2012 | Goggin et al. | 709/216 |
| 2012/0054367 | A1* | 3/2012 | Ramakrishnan et al. | 709/242 |
| 2012/0117563 | A1* | 5/2012 | Chang et al. | 718/1 |

(Continued)

FOREIGN PATENT DOCUMENTS

| CN | 101211277 A | 7/2008 |
| CN | 101557420 A | 10/2009 |
| JP | 2010-039685 | 2/2010 |

(Continued)

OTHER PUBLICATIONS

Jiang et al. Lightweight Live Migration for High Availability Cluster Service, Sep. 2010.*

(Continued)

*Primary Examiner* — Shirley Zhang
(74) *Attorney, Agent, or Firm* — Harness, Dickey & Pierce, P.L.C.

(57) ABSTRACT

Provided is a method and devices for asynchronous virtual machine replication. The method includes determining a class corresponding to a data packet associated with the virtual machine and one of buffering the packet and transmitting the packet based on the determined class.

23 Claims, 6 Drawing Sheets

(56) References Cited

U.S. PATENT DOCUMENTS

2012/0173757 A1* 7/2012 Sanden .................. 709/238
2013/0077636 A1* 3/2013 Stathopoulos et al. ....... 370/412

FOREIGN PATENT DOCUMENTS

| | | |
|---|---|---|
| JP | 2010-199464 | 9/2010 |
| JP | 2012-058866 | 3/2012 |
| WO | WO 2010-123140 | 10/2010 |

OTHER PUBLICATIONS

Cully et al., Remus: High Availability via Asynchronous Virtual Machine Replication, 2008.*

Brendan Cully et. al; "Remus: High Availablity via Asynchronous Virtual Machine Replication", Proceedings of the 5th USENIX Symposium on Implementation, Apr. 16, 2008, pp. 161-174 XP55018714.

Yuyang Du et al.: "Paratus: Instantaneous Failover via Virtual Machine Replication", Aug. 27, 2009, GRID and Cooperative Computing, 2009, GCC '09. Eighth International Conference on IEEE, Piscataway, NJ, USA pp. 307-812, XP031542043.

Coesa A et al.: "Transparent Fault-Tolerance Based on Asynchronous Virtual Machine Replication", Symbolic and Numeric Algorithms for Scientific Computing (SYNASC), 2010 12th International Sysmposium on IEEE, Sep. 23, 2010, pp. 442-448, XP031980937.

International Search Report dated Jul. 5, 2012 for related international Application No. PCT/US2011/061646.

Korean Office Action dated Jun. 23, 2014 issued in KR Application No. 2013-7014759 (translation).

Office Action in corresponding Chinese Patent Application No. 201180059502.6, dated Feb. 10, 2015.

Aug. 26, 2014 Japanese Office Action issued in Japanese Application No. 2013-543187 (with translation).

* cited by examiner

ASYNCHRONOUS VIRTUAL MACHINE REPLICATION

FIELD OF THE INVENTION

Embodiments relate to asynchronous replication of virtual machines.

BACKGROUND OF THE INVENTION

Virtualization of a computing infrastructure such as that used for offering telephone communications services involves offering such services over a computing environment.

Virtualization may include the use of physical machines, servers and virtual machines. A physical machine or a server is a physical entity. A virtual machine includes software executing on a physical machine which emulates an independent and separate machine from other virtual machines which may be emulated on the same physical machine. A single physical machine may host multiple virtual machines. The term "server" may refer to either a physical machine or a virtual machine, based on context.

Virtual machines may be replicated using one of two methods. One is Synchronous Virtual Machine Replication and a second is Asynchronous Virtual Machine Replication. Synchronous Virtual Machine Replication is too slow to be practically useful for high data-rate applications. Asynchronous Virtual Machine Replication, although significantly better than the Synchronous solution, is not directly applicable to high data rate applications, because of the restrictions it imposes on outbound traffic (all transmitted packets need to be buffered for extended periods of time, resulting in significant bandwidth decrease).

Asynchronous replication guarantees that external clients have a consistent view of the replicated system regardless of failures. Primary and backup are only in sync at certain intervals. If all data packet transmissions happen for data packets that were created in the previous time interval, then the consistency is guaranteed, because the previous interval has been successfully committed to the backup.

Because all data packets are buffered in the known asynchronous methods, packets are only transmitted every default time interval (Tepoch), thus reducing effective bandwidth by a factor proportional to the duration of the interval. Further, in the known asynchronous methods outside clients will experience periods of inactivity during packet buffering followed by brief periods of very high network traffic during buffer release. Still further, in the known asynchronous methods a response from the replicated virtual machine will be delayed on average by Tepoch/2.

SUMMARY OF THE INVENTION

The Example embodiments relate to asynchronous replication of virtual machines.

One embodiment includes a method for replicating a virtual machine. The method includes determining a class corresponding to a data packet associated with the virtual machine and one of buffering the packet and transmitting the packet based on the determined class.

Another embodiment includes a control module associated with a host of a virtual machine. The control module includes a memory configured to buffer data packets. The control module includes a packet classifier configured to determine a class corresponding to a packet associated with the virtual machine and configured to one of buffer the packet in the memory and transmit the packet based on the determined class.

Another embodiment includes a network switch. The network switch includes a module configured to receive a message from a control module hosting a virtual machine, the message including protocol information and control information corresponding to a packet associated with the virtual machine. The network switch further includes a packet classifier configured to determine a class based on the protocol information and the control information and configured to one of buffer the packet and transmit the packet based on the determined class.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the for in of flowcharts) that may be implemented as program modules or functional processes include routines, programs, objects, components, data structures, etc., that perform particular tasks or implement particular abstract data types and will be implemented using existing hardware at existing network elements. Such existing hardware will include at least one of one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program/non-transitory storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

As used herein, the term "client" may be considered synonymous to, and may hereafter be occasionally referred to, as a mobile, mobile unit, mobile station, user equipment, remote station, access terminal, receiver, etc., and may describe a remote user of a wired or wireless resources in a communication network.

As used herein, the term "physical machine" may be considered synonymous to, and may hereafter be occasionally referred to, as a server, a network device, a networked computer, etc., and may describe a physical computing device of a wired or wireless communication network and configured to host a virtual machine.

Figure 1:
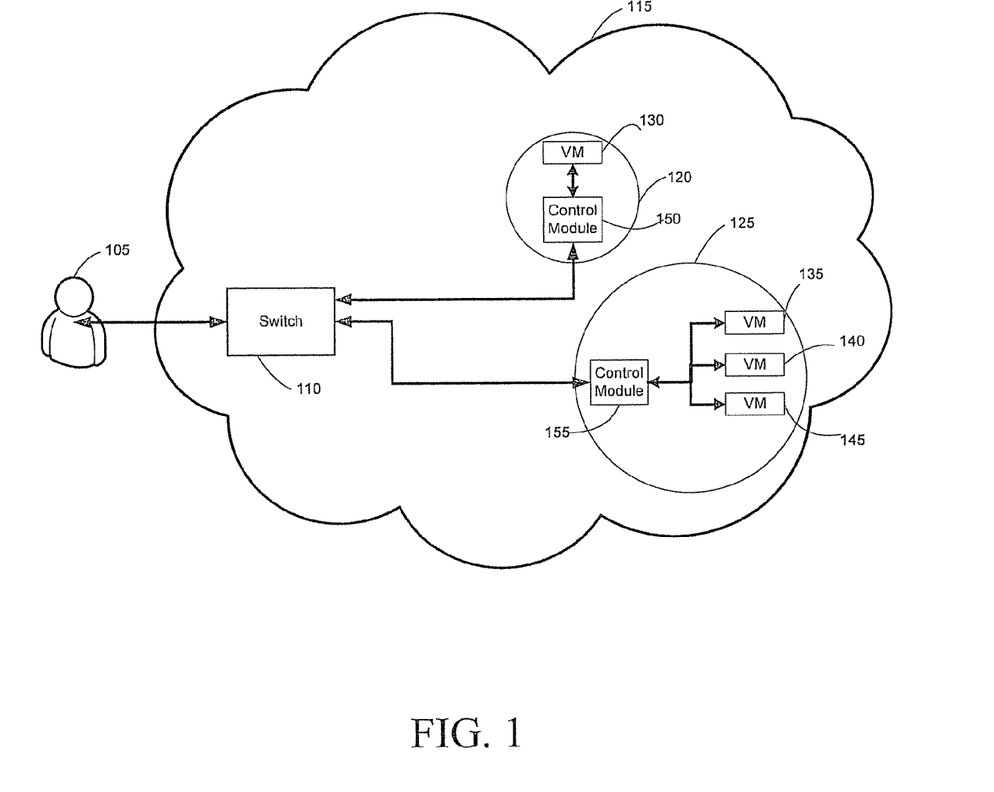
FIG. 1 illustrates a network according to an example embodiment.

FIG. 1 illustrates a network according to an example embodiment. As shown in FIG. 1, a client 105 may be interconnected with a switch 110 (described in more detail with regard to FIG. 4 below). Although only one client is shown, it will be understood that example embodiments are not limited to one client 105. The switch 110 is included in a network environment 115.

The network environment 115 includes one or more physical machines 120, 125. A physical machine 120, 125 may include a control module 150, 155. A physical machine 120, 125 may include one or more virtual machines 130, 135, 140, 145. For example physical machine 120 includes control module 150 and a single virtual machine 130, and physical machine 125 includes control module 155 and three virtual machines 135, 140, 145.

The control modules 150, 155 may be known to one skilled in the art as, for example, a Hypervisor or a Virtual Machine Manager (VMM). The control modules 150, 155 may be configured to host one or more virtual machines 130, 135, 140, 145. The control modules 150, 155 will be discussed in more detail with regard to FIG. 2 and FIG. 3 below.

As one skilled in the art knows, a virtual machine 130, 135, 140, 145 is a software implementation of a machine that executes software as if the virtual machine 130, 135, 140, 145 were a physical machine. Multiple virtual machines 130, 135, 140, 145 may be executed on a physical machine 120, 125. Similar to how an Operating System may allow multiple programs to run concurrently on a physical machine 120, 125, the control module 150, 155 or Hypervisor may allow multiple virtual machines 130, 135, 140, 145 to run concurrently on a physical machine 120, 125. For the sake of brevity, the general operation of a virtual machine 130, 135, 140, 145 will not be further described.

A network environment 115 is known to those skilled in the art. In general, a network environment 115 will be composed of multiple components (e.g., servers, databases, routers and multiplexers) communicating with each other and functioning to provide services to clients 105. Services include, for example, voice, media, applications, computing resources and the like. Network environment 115 provides flexible computing resources to many clients 105. As one skilled in the art knows, a network environment 115 may be a public network, a private network and/or a hybrid (public/private) network.

Figure 2:
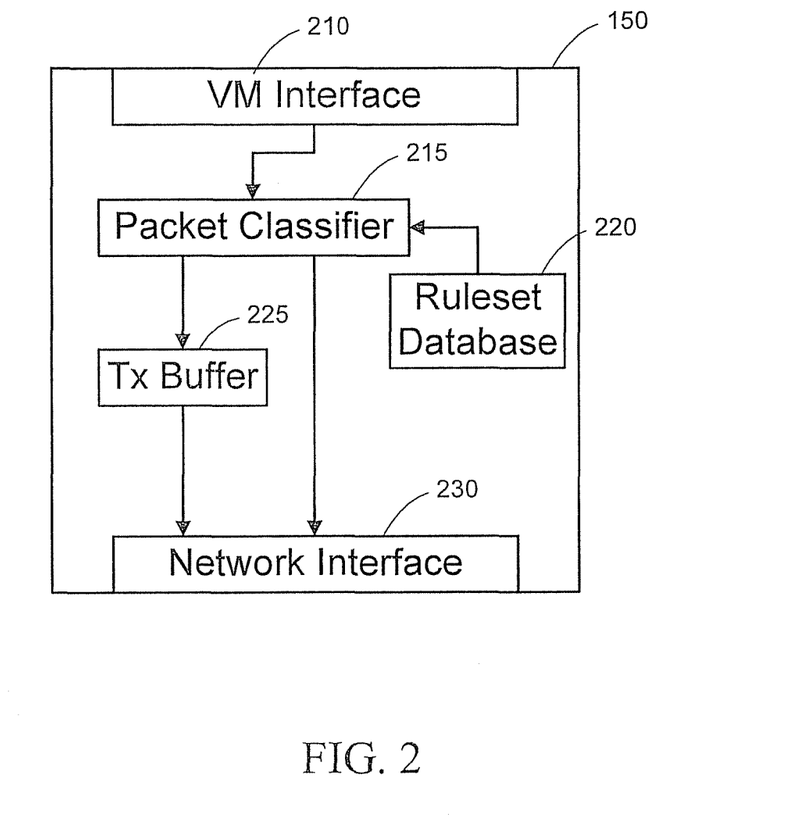
FIG. 2 illustrates a control module 150 according to an example embodiment.

FIG. 2 illustrates a control module 150 according to an example embodiment. As shown in FIG. 2, the control module 150 may include a virtual machine interface 210, a packet classifier 215, a ruleset database 220, a transmit buffer 225 and a network interface 230. The virtual machine interface 210 functions as an interface for packets and signals transmitted to and received from one or more virtual machines. The network interface 230 functions as an interface for packets and signals transmitted to and received from one or more network elements (e.g., routers, switches, clients, etc.). Interfaces (e.g., virtual machine interface 210 and network interface 230) are known to those skilled in the art and will not be described further for the sake of brevity.

The packet classifier 215 may receive, as input, data packets received from a virtual machine (e.g., virtual machine 130) via the virtual machine interface 210 and forward a data packet based on a determined class corresponding to the data packet and a status of the virtual machine. The data packet is forwarded to either the transmit buffer 225 or the network interface 230 based on the determination. The transmit buffer 225 may be a memory (e.g., ROM, RAM, SDRAM, DDR, and etc.).

For example, the packet classifier 215 determines whether data packets associated with a replicated virtual machine are to be buffered (e.g., in transmit buffer 225) such that any data packets that do not change the externally visible state of the replicated virtual machine are not buffered. Whereas data packets that change the externally visible state of the replicated virtual machine are buffered. An externally visible state may be a virtual machine state that is visible to a client.

Data packets that do not change the externally visible state of the replicated virtual machine may be, for example, forwarded data packets (e.g., data packets not originating at the virtual machine) and data packets only including data. Data packets that do change the externally visible state of the replicated virtual machine may be, for example, data packets including control messages.

The ruleset database 220 may include, for example, a data table that associates types of data packets (e.g., data or control) with a class. Each class may define whether or not the data packet is to be buffered. The ruleset database 220 may be changed at any time and may be controlled by an application associated with the control module 150 and/or an application associated with the virtual machine.

For example, assume control module 150 receives two data packets from virtual machine 130 and that virtual machine 130 is a replicated virtual machine. The first data packet is associated with class one and the second data packet is associated with class two. The ruleset database 220 includes associations such that class one is a data only data packet and class two is a data packet including control messages.

The packet classifier 215 uses the associations from the ruleset database 220 to determine that the first data packet is not to be buffered based on the association of class one being a data only data packet, which is a data packet that does not change the externally visible state of replicated virtual machine 130. The packet classifier 215 uses the associations from the ruleset database 220 to determine that the second data packet is to be buffered based on the association of class two being a data packet including control messages, which is a data packet that changes the externally visible state of replicated virtual machine 130. Therefore, the packet classifier 215 forwards the first data packet directly to the network interface 230 and forwards the second data packet to the transmit buffer 225.

Figure 3:
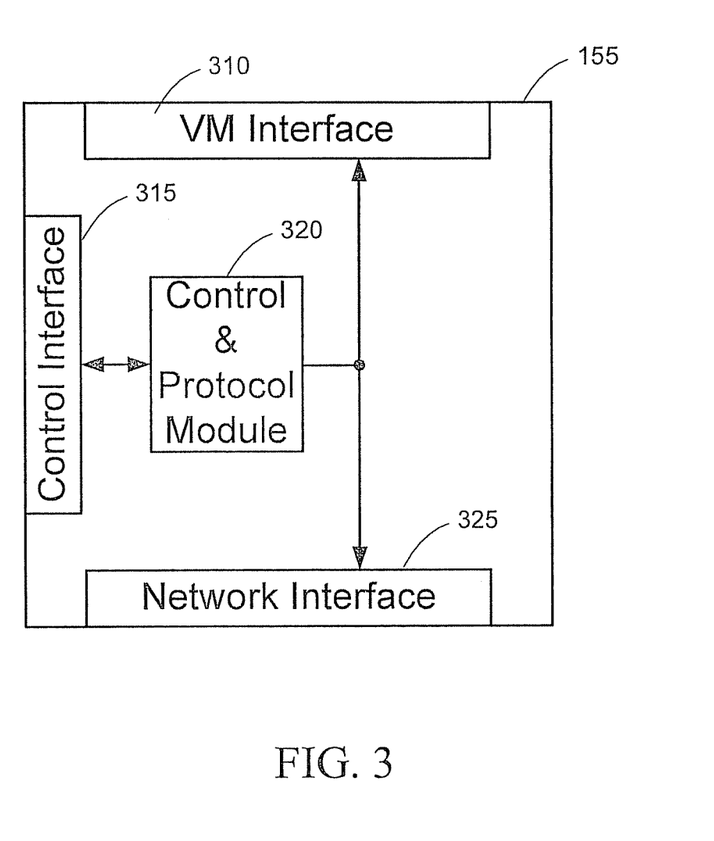
FIG. 3 illustrates an alternative control module 155 according to an example embodiment.

FIG. 3 illustrates an alternative control module 155 according to an example embodiment. As shown in FIG. 3, the control module 155 may include a virtual machine interface 310, a control interface 315, a control and protocol module 320 and a network interface 325. The virtual machine interface 310 functions as an interface for signals transmitted to and received from one or more virtual machines. The control interface 315 functions as an interface for packets and signals transmitted to and received from one or more switches (e.g., switch 110). The network interface 325 functions as an interface for packets and signals transmitted to and received from one or more network elements (e.g., routers, switches, clients, etc.). Interfaces (e.g., virtual machine interface 310, control interface 315 and network interface 325) are known to those skilled in the art and will not be described further for the sake of brevity.

The control and protocol module 320 monitors data packets transmitted through the control module 155. The control and protocol module 320 monitors data packets to determine information associated with the data packets. For example, the control and protocol module 320 may monitor packets to determine whether the data packet is a data packet including control messages. For example, the control and protocol module 320 may monitor packets to determine a protocol associated with the data packet.

The control and protocol module 320 communicates the information to the control interface 315. The control interface 315 communicates this information to another network element (e.g., switch 110).

Figure 4:
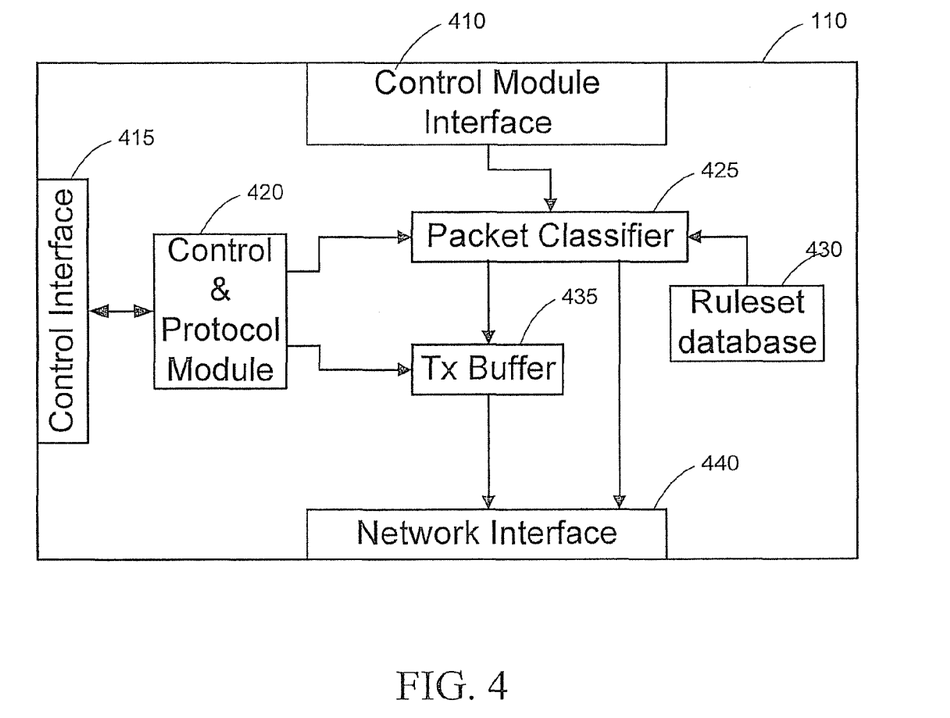
FIG. 4 illustrates a switch 110 according to an example embodiment.

FIG. 4 illustrates a switch 110 according to an example embodiment. As shown in FIG. 4 the switch 110 may include a control module interface 410, a control interface 415, a control and protocol module 420, a packet classifier 425, a ruleset database 430, a transmit buffer 435 and a network interface 440. The control module interface 410 functions as an interface for packets and signals transmitted to and received from one or more control modules (e.g., control module 155). The control interface 415 functions as an interface for signals transmitted to and received from one or more control modules (e.g., control module 155). The network interface 440 functions as an interface for packets and signals transmitted to and received from one or more network elements (e.g., routers, switches, clients, etc.). Interfaces (e.g., control module interface 410, control interface 415 and network interface 440) are known to those skilled in the art and will not be described further for the sake of brevity.

The control and protocol module 420 may receive packet information associated with data packets. The data packets may be received from a control module (e.g., control module 155) via control module interface 410. The packet information may be received from a control module (e.g., control module 155) via control interface 415. The control and protocol module 420 may determine whether a data packet is a data packet including control messages, whether a data packet is a data packet including only data or a protocol associated with the data packet based on the packet information. The control and protocol module 420 may communicate the determination to the packet classifier 425 and the transmit buffer 435.

The packet classifier 425 may receive as input, data packets received from a control module (e.g., control module 155) via the control module interface 410, and the packet classifier 425 may forward a data packet based on a determined class corresponding to the data packet and a status of the virtual machine. The data packet is forwarded to either the transmit buffer 435 or the network interface 440 based on the determination.

For example, the packet classifier 425 determines whether data packets associated with a replicated virtual machine are to be buffered (e.g., in transmit buffer 435) such that any data packets that do not change the externally visible state of the replicated virtual machine are not buffered. Whereas data packets that change the externally visible state of the replicated virtual machine are buffered. The transmit buffer 435 may be a memory (e.g., ROM, RAM, SDRAM, DDR, and etc.).

Data packets that do not change the externally visible state of the replicated virtual machine may be, for example, forwarded data packets (e.g., data packets not originating at the virtual machine) and data packets only including data. Data packets that do change the externally visible state of the replicated virtual machine may be, for example, data packets including control messages.

The ruleset database 430 may include, for example, a data table that associates types of data packets (e.g., data or control) with a class. Each class may define whether or not the data packet is to be buffered. The ruleset database 430 may be changed at any time and may be controlled by an application associated with the switch 110 and/or an application associated with a virtual machine (e.g., virtual machine 135).

For example, assume switch 110 receives two data packets from a control module (e.g. control module 155) and that virtual machine 135 is a replicated virtual machine. The first data packet is associated with class one and the second data packet is associated with class two. The ruleset database 430 includes associations such that class one is a data only data packet and class two is a data packet including control messages.

The control and protocol module 420 receives first packet information associated with the first data packet and the second data packet. The control and protocol module 420 also receives second packet information indicating the virtual machine 130 is the source of the first data packet and the second data packet. The first packet information includes at least an indication that the first data packet is associated with class one and the second data packet is associated with class two. The second packet information includes at least an indication that virtual machine 130 is a replicated virtual machine. The control and protocol module 420 communicates the first and the second packet information (or determinations about the classes and replication) to the packet classifier 425.

The packet classifier 425 uses the associations from the ruleset database 430 to determine that the first data packet is not to be buffered based on the association of class one being a data only data packet, which is a data packet that does not change the externally visible state of replicated virtual machine 135. The packet classifier 425 uses the associations from the ruleset database 430 to determine that the second data packet is to be buffered based on the association of class two being a data packet including control messages, which is a data packet that changes the externally visible state of replicated virtual machine 135. Therefore, the packet classifier forwards the first data packet directly to the network interface 440 and forwards the second data packet to the transmit buffer 435.

Figure 5:
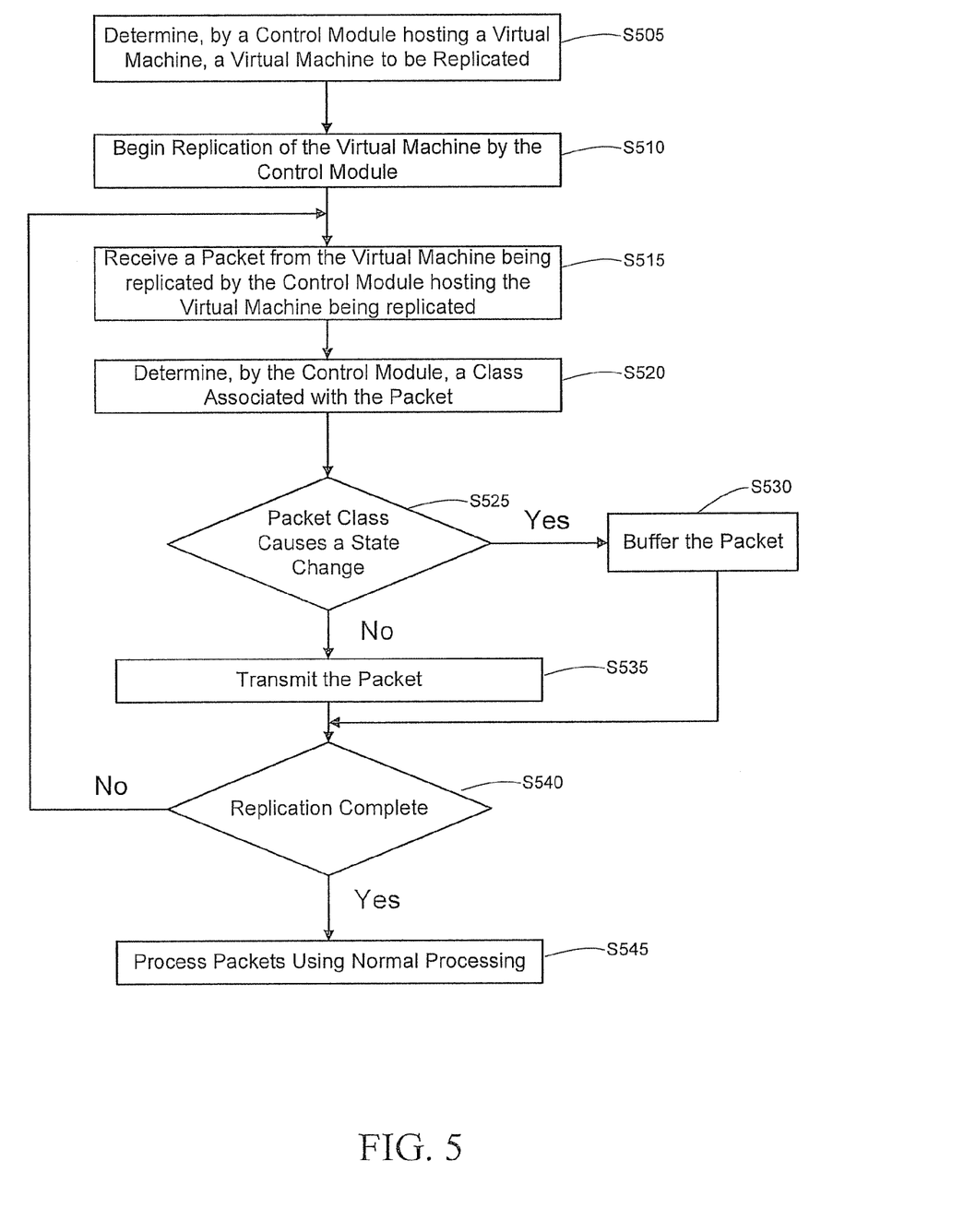
FIG. 5 illustrates a method for asynchronous virtual machine replication according to an example embodiment.

FIG. 5 illustrates a method for asynchronous virtual machine replication according to an example embodiment. While describing the steps of the method associated with FIG. 5, reference will be made to the network of FIG. 1 and the control module 150 of FIG. 2.

Referring to FIG. 5, in step S505 a control module hosting a virtual machine determines the virtual machine is to be replicated. In step S510 the control module begins replication of the virtual machine. Determining a virtual machine is to be replicated and initiating replication of the virtual machine are known to those skilled in the art and will not be described further for the sake of brevity.

In step S515 the control module receives a data packet from the virtual machine being replicated. For example, control module 150 may receive a data packet from virtual machine 130 (assuming virtual machine 130 is the virtual machine being replicated). Control module 150 may receive the data packet via virtual machine interface 210 as shown in FIG. 2.

In step S520 the control module 150 determines a class associated with the data packet. For example, the packet classifier 215 may determine a class associated with a data packet based on whether data packets associated with the virtual machine being replicated are to be buffered (e.g., in transmit buffer 225) such that any data packets that do not change the externally visible state of the virtual machine being replicated are not buffered. Whereas data packets that change the externally visible state of the virtual machine being replicated are buffered.

Data packets that do not change the externally visible state of the virtual machine being replicated may be, for example, forwarded data packets (e.g., data packets not originating at the virtual machine) and data packets only including data. Data packets that do change the externally visible state of the virtual machine being replicated may be, for example, data packets including control messages.

For example, as described above, the ruleset database 220 may include a data table that associates types of data packets (e.g., data or control) with a class. Each class may define whether or not the data packet is to be buffered. The packet classifier 215 may use the associations between the data packets and the class in step S520 to determine whether data packets associated with the virtual machine being replicated are to be buffered.

In step S525 the control module 150 determines if the class causes a state change (e.g., the data packet includes control messages). If the class causes a state change, in step S530 the data packet is buffered (e.g., in transmit buffer 225). Otherwise, in step S535 the data packet is transmitted (e.g., via network interface 230). Steps S520 and S525 may be performed by the packet classifier 215 as described above with regard to FIG. 2.

In step S540 the control module 150 determines if the replication is complete. If replication is not complete, processing returns to step S515. Otherwise, in step S545 data packets are processed using normal (known) processing. Determining if replication is complete and normal processing of data packets are known to those skilled in the art and will not be described further for the sake of brevity.

Figure 6:
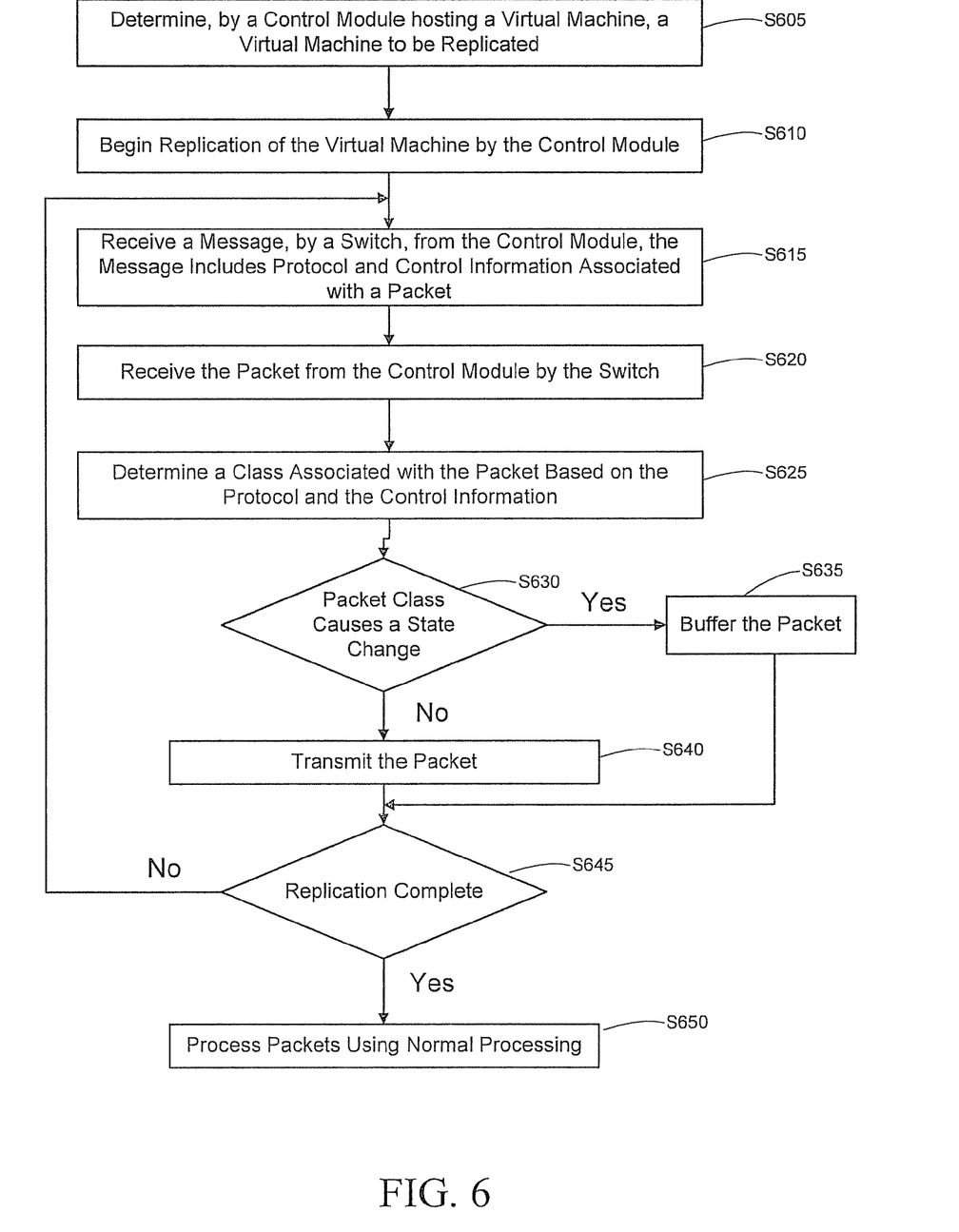
FIG. 6 illustrates a method for asynchronous virtual machine replication according to an example embodiment.

FIG. 6 illustrates a method for asynchronous virtual machine replication according to an example embodiment. While describing the steps of the method associated with FIG. 6, reference will be made to the network of FIG. 1, the control module 155 of FIG. 3 and the switch 110 of FIG. 4.

Referring to FIG. 6, in step S605 a control module hosting a virtual machine determines the virtual machine is to be replicated. In step S610 the control module begins replication of the virtual machine. Determining a virtual machine is to be replicated and initiating replication of the virtual machine are known to those skilled in the art and will not be described further for the sake of brevity.

In step S615 the switch 110 receives a message from a control module (e.g., control module 155). The message includes protocol and control information associated with a data packet. Protocol and control information may include a protocol associated with the data packet, a class (as described above) associated with the data packet, control message information associated with the data packet and/or data type information associated with the data packet.

For example, control module 155 may determine the protocol and control information as described above with regard to FIG. 3. Control module 115 may send a signaling message to switch 110 via control interface 315. Switch 110 may then receive the signaling message via control interface 415 and the control and protocol module 420 processes the signaling message as discussed above with regard to FIG. 4.

In step S620 the switch 110 receives a data packet from the control module (e.g., control module 155) hosting the virtual machine being replicated. For example, switch 110 may receive a data packet from virtual machine 135 (assuming virtual machine 135 is the virtual machine being replicated). The data packet may be received via control module 155. Switch 110 may receive the data packet via control module interface 410 as shown in FIG. 4.

In step S625 the switch 110 determines a class associated with the data packet. For example, the packet classifier 425 may determine a class associated with a data packet based on whether data packets associated with the virtual machine being replicated are to be buffered (e.g., in transmit buffer 435) such that any data packets that do not change the externally visible state of the virtual machine being replicated are not buffered. Whereas data packets that change the externally visible state of the virtual machine being replicated are buffered.

Data packets that do not change the externally visible state of the virtual machine being replicated may be, for example, forwarded data packets (e.g., data packets not originating at the virtual machine) and data packets only including data. Data packets that do change the externally visible state of the virtual machine being replicated may be, for example, data packets including control messages.

For example, as described above, the ruleset database 220 may include a data table that associates types of data packets (e.g., data or control) with a class. Each class may define whether or not the data packet is to be buffered. The packet classifier 215 may use the associations between the data packets and the class in step S625 to determine whether data packets associated with the virtual machine being replicated are to be buffered.

In step S630 the switch 110 determines if the class causes a state change (e.g., the data packet includes control messages). If the class causes a state change, in step S635 the data packet is buffered (e.g., in transmit buffer 435). Otherwise, in step S640 the data packet is transmitted (e.g., via network interface 440). Steps S625 and S630 may be performed by the packet classifier 425 as described above with regard to FIG. 4.

In step S645 the switch 110 determines if the replication is complete. If replication is not complete, processing returns to step S615. Otherwise, in step S650 data packets are processed using normal (known) processing. Determining if replication is complete and normal processing of data packets are known to those skilled in the art and will not be described further for the sake of brevity.

Although example embodiments describe a new method (e.g., FIG. 5 and FIG. 6) including buffering data packets during asynchronous virtual machine replication, example embodiments are not limited thereto. For example, a virtual machine may be replicated to create a backup or standby virtual machine. Data packets associated with the backup or standby virtual machine may be processed using the same methods and using the same apparatus as described above.

For example, the method of FIG. 5 may be performed from the view point of a primary virtual machine and a virtual machine that is a backup of the primary virtual machine. In this example, the virtual machine being replicated becomes the primary virtual machine and step S540 is replaced by questioning whether or not the backup virtual machine continues to be used. A similar alternative example embodiment may be based on FIG. 6.

Alternative embodiments of the invention may be implemented as a computer program product for use with a computer system, the computer program product being, for example, a series of computer instructions, code segments or program segments stored on a tangible or non-transitory data recording medium (computer readable medium), such as a diskette, CD-ROM, ROM, or fixed disk, or embodied in a computer data signal, the signal being transmitted over a tangible medium or a wireless medium, for example, microwave or infrared. The series of computer instructions, code segments or program segments can constitute all or part of the functionality of the methods of example embodiments described above, and may also be stored in any memory device, volatile or non-volatile, such as semiconductor, magnetic, optical or other memory device.

Example embodiments provide an improved solution for asynchronous replication of a virtual machine because in known methods all data packets are buffered from a replicated virtual machine. Because all data packets are buffered in the known methods, packets are only transmitted every default time interval (Tepoch), thus reducing effective bandwidth by a factor proportional to the duration of the interval. Further, in the known methods outside clients will experience periods of inactivity during packet buffering followed by brief periods of very high network traffic during buffer release. Still further, in the known methods a response from the replicated virtual machine will be delayed on average by Tepoch/2.

While example embodiments have been particularly shown and described, it will be understood by one of ordinary skill in the art that variations in form and detail may be made therein without departing from the spirit and scope of the claims.

The invention being thus described, it will be obvious that the same may be varied in many ways. Such variations are not to be regarded as a departure from the invention, and all such modifications are intended to be included within the scope of the invention.

We claim:

1. A method for replicating a source virtual machine, the method comprising:
   determining, by a network element, a class corresponding to a data packet associated with the virtual machine; and
   one of buffering the data packet and transmitting the data packet based on the determined class, the buffering of the data packet including holding the data packet in a transmission buffer until a time interval when the source virtual machine is synchronized with a backup virtual machine, the transmitting of the data packet including transmitting the data packet from the source virtual machine to the backup virtual machine even during time intervals when the source virtual machine is not synchronized with the backup virtual machine,
   the class is determined based on a type of the data packet, and
   the type is one of a data packet including control messages and a data packet including only data without control messages.

2. The method of claim 1, further comprising:
   comparing the determined class to a rule set, the rule set including a plurality rules based on the class and the type of data packet.

3. The method of claim 2, wherein data packets including control messages are buffered.

4. The method of claim 3, wherein data packets including only data are transmitted.

5. The method of claim 1, wherein the network element is associated with a host of a virtual machine being replicated.

6. The method of claim 1, wherein the network element is a network switch.

7. The method of claim 6, further comprising:
   receiving control and protocol messages, by the network switch, from a control module hosting the virtual machine; and
   receiving the data packet, by the network switch, from the control module hosting the virtual machine, wherein the control and protocol messages are used to determine the class corresponding to the data packet.

8. The method of claim 1, wherein the data packet including only data without control messages is a data packet with payload data.

9. The method of claim 1, wherein,
   the data packet including control messages is a data packet that changes an external visible state of the replicated virtual machine, and
   the data packet including only data without control messages is a data packet that does not change the external visible state of the replicated virtual machine.

10. A control module associated with a host of a virtual machine, the control module comprising:
    a memory configured to buffer data packets; and
    a packet classifier configured to determine a class corresponding to a data packet associated with the virtual machine and configured to one of buffer the data packet in the memory and transmit the data packet based on the determined class,
    the class is determined based on a type of the packet, and
    the type is one of a data packet including control messages and a data packet including only data without control messages,
    the buffering of the data packet including holding the data packet in the memory until a time interval when the host virtual machine is synchronized with a backup virtual machine, the transmitting of the data packet including transmitting the data packet from the host virtual machine to the backup virtual machine even during time intervals when the host virtual machine is not synchronized with the backup virtual machine.

11. The control module of claim 10, further comprising:
    a ruleset database configured to store a plurality rules based on the class and the type of data packet, wherein the packet classifier is configured to compare the determined class to the plurality of rules.

12. The control module of claim 10, wherein data packets including control messages are buffered.

13. The control module of claim 10, wherein data packets including only data are transmitted.

14. The control module of claim 10, further comprising:
    a virtual machine interface configured to transmit and receive data packets to and from one or more virtual machines; and
    a network interface configured to transmit and receive data packets to and from one or more clients.

15. The control module of claim 10, further comprising:
    a control and protocol module configured to determine a control type and a protocol of the data packet; and
    a control interface configured to transmit the control type and the protocol of the data packet to a network switch.

16. The control module of claim 10, wherein the data packet including only data without control messages is a data packet with payload data.

17. The control module of claim 10, wherein,
    the data packet including control messages is a data packet that changes an external visible state of the virtual machine, and
    the data packet including only data without control messages is a data packet that does not change the external visible state of the virtual machine.

18. A network switch comprising:
    a module, controlled by a computer processor of the network switch, configured to receive a message from a control module of a source virtual machine, the message including protocol information and control information corresponding to a data packet associated with the virtual machine; and
    a packet classifier, controlled by the computer processor of the network switch, configured to determine a class based on the protocol information and the control information and configured to one of buffer the data packet and transmit the data packet based on the determined class, the buffering of the data packet including holding the data packet in a transmission buffer until a time interval when the source virtual machine is synchronized with a backup virtual machine, the transmitting of the data packet including transmitting the data packet from the source virtual machine to the backup virtual machine even during time intervals when the source virtual machine is not synchronized with the backup virtual machine, the class is determined based on a type of the data packet, and the type is one of a data packet including control messages and a data packet including only data without control messages.

19. The network switch of claim 18, further comprising:
a ruleset database configured to store a plurality rules based on the class and the type of data packet, wherein the packet classifier is configured to compare the determined class to the plurality of rules.

20. The network switch of claim 18, wherein
data packets including control messages are buffered; and
data packets including only data are transmitted.

21. The network switch of claim 18, further comprising:
a control module interface configured to transmit and receive data packets to and from one or more control modules hosting one or more virtual machines; and
a network interface configured to transmit and receive data packets to and from one or more clients.

22. The network switch of claim 18, wherein the data packet including only data without control messages is a data packet with payload data.

23. The network switch of claim 18, wherein,
the data packet including control messages is a data packet that changes an external visible state of the virtual machine, and
the data packet including only data without control messages is a data packet that does not change the external visible state of the virtual machine.

* * * * *